United States Patent [19]

Pawelczyk

[11] 4,014,636
[45] Mar. 29, 1977

[54] SYNTHETIC PLASTICS FILM MANUFACTURING PLANT INCLUDING A MULTIPLE-ROLL CALENDER

[75] Inventor: Werner Pawelczyk, Hannover, Germany

[73] Assignee: Hermann Berstorff Maschinenbau GmbH, Hannover-Kleefeld, Germany

[22] Filed: Dec. 19, 1975

[21] Appl. No.: 642,442

[30] Foreign Application Priority Data

Dec. 21, 1974  Germany ............................ 2460873

[52] U.S. Cl. .............................. 425/224; 425/217; 425/305 R; 425/307; 425/327; 425/335; 425/363; 425/367
[51] Int. Cl.² ........................................ B29D 7/14
[58] Field of Search .......... 425/194, 201, 202, 328, 425/329, 335, 337, 339, 363, 367, 373, 224, DIG. 235, 217, 327, 307, 305 R; 264/175, 293, 284, 286; 72/160, 274, 36, 199, 224, 232; 100/161, 162, 155, 163, 164, 165; 156/437, 168, 128

[56] References Cited

UNITED STATES PATENTS

| | | | |
|---|---|---|---|
| 2,038,328 | 4/1936 | Wells | 156/168 |
| 2,815,531 | 12/1957 | Stewart | 425/194 |
| 3,008,864 | 11/1961 | Macklem et al. | 156/437 |
| 3,833,437 | 9/1974 | Appleby et al. | 156/128 |
| 3,936,258 | 2/1976 | Lake | 425/367 |
| 3,964,848 | 6/1976 | Wockener | 425/224 |

FOREIGN PATENTS OR APPLICATIONS

643,711  12/1964  Belgium ............................ 425/335

Primary Examiner—Robert L. Spicer, Jr.
Attorney, Agent, or Firm—Donald D. Jeffery

[57] ABSTRACT

Synthetic plastics film manufacturing plant comprising material feed means, preferably in the form of a screw extruder and rolling mill, feeding a sheet material to a multiple roll calender, the multiple roll calender comprising seven rolls comprising four bottom rolls disposed in an L-shape, one of which four bottom rolls provided in the foot of the L, is an input feed roll, and three rolls disposed one above the other with their axes disposed substantially in the same vertical plane, the lowest roll of said three other rolls being disposed in a horizontal juxtaposition and in rolling contact with the topmost roll of said four bottom rolls and on the same side thereof as the input feed roll.

Preferably a roll of said four bottom rolls which defines an input feed roll gap with said input feed roll is coupled by links to the roll thereabove to form a first linked roll unit; the uppermost roll of said four bottom rolls and the lowermost roll of said three rolls are coupled together to form a second linked roll unit; and the uppermost roll of said three rolls and the roll therebelow are coupled together to form a third link roll unit; said roll units each being adjustably mounted in a frame of the multiple-roll calender.

3 Claims, 1 Drawing Figure

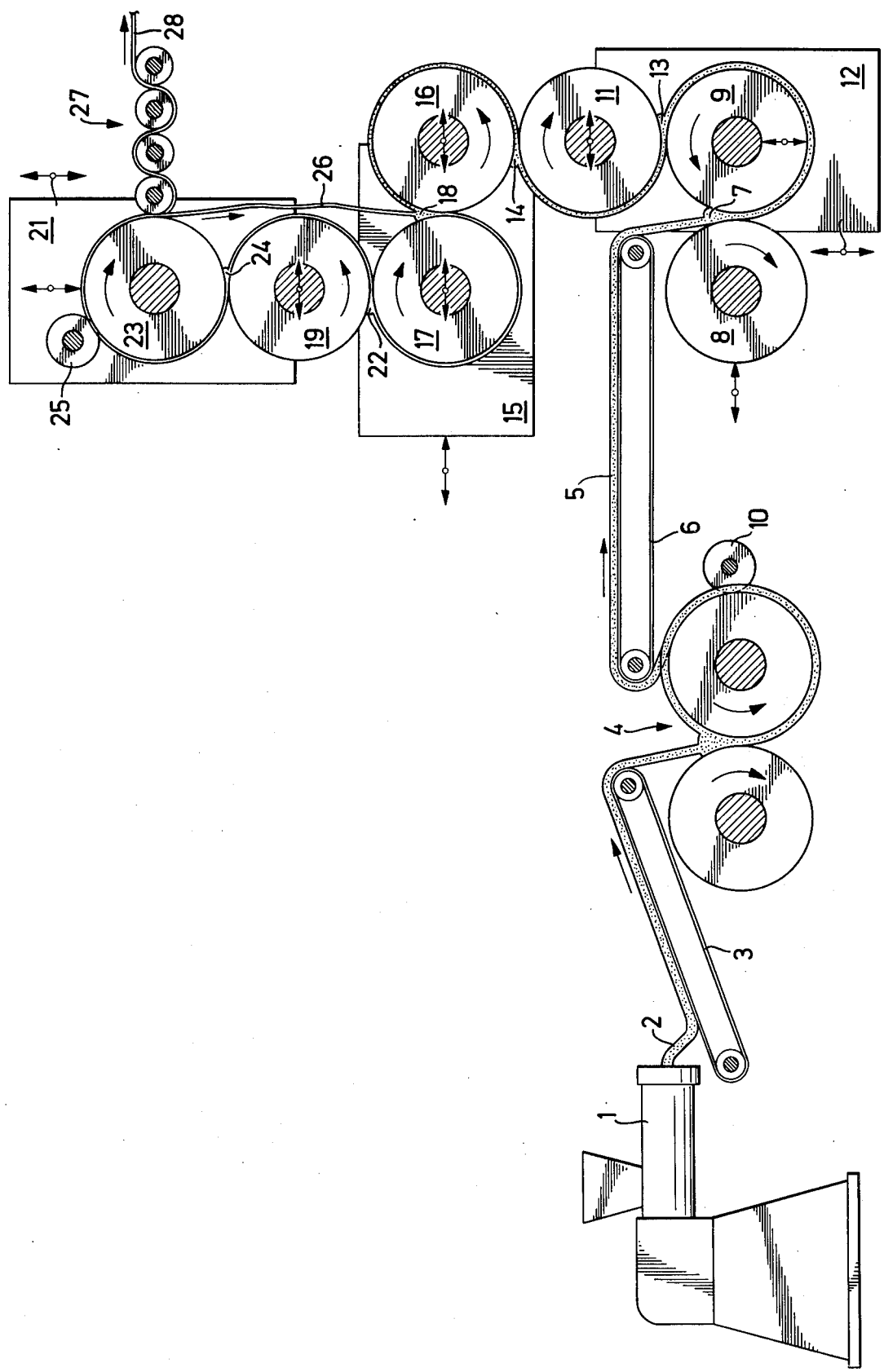

SYNTHETIC PLASTICS FILM MANUFACTURING PLANT INCLUDING A MULTIPLE-ROLL CALENDER

The invention relates to synthetic plastics film manufacturing plant including a multiple-roll calender with an input feed roll and with, for charging the multiple-roll calender, material feed means, preferably comprising a screw extruder supplying a rolling mill.

Increasing the output from a multiple-roll calender, e.g. a five-roll calender, is subject to certain limitations. If the working speed of the calender is increased, the quality of the film produced is impaired, since the heat furnished is reduced. The material fed to the multiple-roll calender by a material preparation plant comprising predominantly a screw extruder and a rolling mill cannot be fully exploited.

At an elevated working speed of the five-roll calender, the material could again be exploited sufficiently satisfactorily if the material preparation plant had a second rolling mill associated with it and through which the material could be passed after leaving the first rolling mill. However, a second rolling mill would make the film producing plant substantially more expensive and greatly increase the amount of space and operating power required.

At an elevated working speed, the material could again be exploited sufficiently satisfactorily if the number of rolls in the calender were increased to seven so that the material could then be passed through two further roll gaps.

A seven-roll calender would however be of considerable height. Furthermore, it must be regarded as disadvantageous, for adjusting the roll gaps, to require a link arrangement for three rolls. This three-roll link would be extremely complicated from the technical point of view. Furthermore, an oblique second device would need to be provided for each of the four rolls disposed between the two end rolls in the vertical plane. Another disadvantage would be that these four rolls would be so-called "floating" rolls, admitting of no definite roll gap.

The invention is based on the problem of providing a synthetic plastics film manufacturing plant of the kind mentioned above with which it is possible to achieve a high rate of output with comparatively small technical complication.

According to the invention there is provided synthetic plastics film manufacturing plant comprising a multiple-roll calender and material feed means for charging the multiple-roll calender, wherein the multiple-roll calender has seven rolls comprising four bottom rolls disposed in an L-shape, one of which four bottom rolls, provided in the foot of the L, is an input feed roll, and three rolls disposed one above the other with their axes disposed substantially in the same vertical plane, the lowest roll of said three other rolls being disposed in a horizontal juxtaposition and in rolling contact with the topmost roll of said four bottom rolls and on the same side thereof as the input feed roll.

Using a seven-roll calender makes it possible to breakdown the material more satisfactorily. The grading of thicknesses from roll gap to roll gap can be smaller than in the case of a five-roll calender which again leads to closer film tolerances. Compared with a simple L-arrangement, the construction of a seven-roll calender according to the invention can ensure a good supply of heat, which is particularly important in the case of thicker films, since the length of looping around the rolls is increased.

Marginal strips cut on the last calender roll can advantageously be fed into the roll gaps formed between the topmost roll of the bottom set and the bottom roll of the top set. Thus, re-use of the waste material is no problem.

In each set of rolls, there need only be one floating roll. All roll gaps can have a definite loading.

In a multiple-roll calender of the kind set out above it is possible for the roll gap adjustment to be performed with three of the hitherto conventional two-roll links. It is not necessary to use any three-roll link which would have to be newly developed.

The invention makes it possible to increase the output of synthetic plastics film manufacturing plants while at the same time maintaining the degree of technical complication within acceptable limits.

The invention is diagrammatically illustrated by way of example in the accompanying drawing which shows plant for manufacturing synthetic plastics film according to the invention.

Referring to the drawing, a screw extruder 1 extrudes rod-shaped material 2 which is transported by a first conveyor belt 3 into the working gap of a two-roll rolling mill 4. From a sheet of material produced by the rolling mill 4, a strip 5 of material is cut by a cutter 10 and fed from the second roll of the rolling mill 4 to a second conveyor belt 6 and thereby into a feed gap 7 of a seven-roll calender.

The feed gap 7 is formed between an input feed roll 8 and an adjacent roll 9, the roll 9 being mounted in a two-roll link 12 with a roll 11 which is provided vertically above the roll 9. The roll 9 is vertically displaceable within the two-roll link 12 for the purpose of adjusting the roll gap 13. The roll 11 can be adjusted obliquely.

For adjustment of a roll gap 14 between the roll 11 and a roll 16 thereabove, the two-roll link 12 is displaceably guided in the calender frame (not shown). The roll 16 is disposed in a horizontally extending two-roll link 15 with a roll 17.

Like the roll 17 disposed alongside it in the two-roll link 15, the roll 16 is obliquely adjustable via the two-roll link 15, which is guided for horizontal displacement in the calender frame, (not shown). Within the two-roll link 15, the roll 17 is displaceably mounted for adjustment of a roll gap 18 between the roll 16 and the roll 17.

The roll 17 is in rolling contact with a roll 19 disposed vertically thereabove, the roll 19 being obliquely adjustable and being disposed within a two-roll link 21. For adjustment of a roll gap 22 between the roll 17 and the roll 19, the two-roll link 21 is vertically displaceable in the calender frame (not shown). Disposed above the roll 19 in the two-roll link 21 is a further roll 23 which is mounted for vertical displacement within the two-roll link 21 in order to permit adjustment of a roll gap 24 between the rolls 19 and 23.

A cutting arrangement 25 is provided and the roll 23 for trimming off film edge strips 26, the film edge strips being fed directly back into the roll gap 18. A pull-off arrangement 27 removes the trimmed film 28.

Each set of rollers 8, 9, 11 and 16 and 17, 19, 23 has only one floating roll, viz the 11 or 19. The rolls which are in rolling contact with a floating roll are not supported by any other roll on the side opposite the relevant roll gap. The roll gap loadings are definable and can be compensated via the end rolls of each set of rollers, by means of roll counter-flexing devices or roll convexities. Therefore, it is possible to dispense with the oblique adjustment of the rolls 11 and 19.

What is claimed is:

1. Synthetic plastics film manufacturing plant comprising a multiple-roll calender and material feed means for charging the multiple-roll calender, wherein the multiple-roll calender has seven rolls comprising four bottom rolls disposed in an L-shape, one of which of said four bottom rolls, provided in the foot of the L, is an input feed roll, and three rolls disposed one above the other with their axes disposed substantially in the same vertical plane, the lowest roll of said three other rolls being disposed in a horizontal juxtaposition and in rolling contact with the topmost roll of said four bottom rolls and on the same side thereof as said input feed roll.

2. Synthetic plastics film manufacturing plant as claimed in claim 1, wherein said material feed means comprises a screw extruder, a rolling mill, a conveyor to convey material extruded by said screw extruder to said rolling mill and a further conveyor to convey strip material issuing from said rolling mill to said input feed roll of said multiple-roll calender.

3. Synthetic plastics film manufacturing plant according to claim 1, wherein said multiple roll calender has a frame; a roll of said four bottom rolls defines an input feed roll gap with said input feed roll and is coupled by links to the roll thereabove to form a first linked roll unit, the uppermost roll of said four bottom rolls and the lowermost roll of said three rolls are coupled together to form a second linked roll unit; and the uppermost roll of said three rolls and the roll therebelow are coupled together to form a third linked roll unit; each of said first, said second and said third roll units being adjustably mounted in said frame.

* * * * *